April 22, 1941.    K. KOLLMANN    2,238,889
BLOWER DRIVE, ESPECIALLY FOR AIRPLANE ENGINES
Filed Nov. 15, 1938    3 Sheets-Sheet 1

INVENTOR.
KARL KOLLMANN
BY Haseltine, Lake & Co.
ATTORNEYS

April 22, 1941.  K. KOLLMANN  2,238,889
BLOWER DRIVE, ESPECIALLY FOR AIRPLANE ENGINES
Filed Nov. 15, 1938  3 Sheets-Sheet 2

Inventor:
KARL KOLLMANN
BY: Haseltine, Lake & Co.
Attorneys

April 22, 1941.   K. KOLLMANN   2,238,889
BLOWER DRIVE, ESPECIALLY FOR AIRPLANE ENGINES
Filed Nov. 15, 1938    3 Sheets-Sheet 3

INVENTOR:
KARL KOLLMANN
BY
Haseltine, Lake & Co.
ATTORNEYS

Patented Apr. 22, 1941

2,238,889

UNITED STATES PATENT OFFICE 2,238,889

BLOWER DRIVE, ESPECIALLY FOR AIRPLANE ENGINES

Karl Kollmann, Stuttgart-Bad Cannstatt, Germany, assignor to Daimler-Benz Aktiengesellschaft, Stuttgart-Unterturkheim, Germany Application November 15, 1938, Serial No. 240,474
In Germany June 27, 1935

15 Claims. (Cl. 123—119)

This invention relates to a drive for blowers especially for high speeds and high performances preferably for airplane or racing engines, and substantially provides the alternative connection in series or parallel of two disengageable or non-disengageable clutches of the type of the hydraulic clutches.

In the known drives for blowers especially for airplanes great difficulties were experienced chiefly on account of the high speeds of the blowers (up to about 24,000 revolutions per minute). Thus, strong rotary oscillations and shocks were transmitted to the blower even when mechanical clutches, such as plate clutches or the like, were interposed. Furthermore, such clutches could not be made disengageable without endangering the driving mechanism parts by the strong shocks occurring during the engagement and disengagement at the high speeds. Consequently, continually rotating blowers were usually employed. Even an arrangement of disengageable clutches in the shafts running at lower speed was found unpractical on account of the very large dimensions of these clutches.

It has also been endeavoured to overcome the difficulties by rotary elastic clutches. However, such a drive did not give satisfaction as in this instance high frequency oscillations occurred on the blower. It has also already been proposed to provide an engageable and disengageable hydraulic clutch for one blower. But this ensures only a limited regulation, which is not sufficient. Finally also two mechanical, parallel working clutches have been suggested for blowers. These devices are subjected to material wear and can not be built sufficiently small and light; it is also impossible to engage and disengage them without shocks.

These objections are entirely eliminated by the invention. By interposing a clutch of the type of the hydraulic clutches for each blower oscillations are kept entirely away from the blower. The clutch allows extremely gentle starting up and regulation so that, in spite of the high speed, a smooth engagement and disengagement and any desired speed regulation from maximum speed to zero is possible, this being of great advantage, particularly in blowers of high flying airplanes. The clutch can also be arranged directly on the blower shaft rotating at high speeds and therefore it can be made in very small dimensions. The invention provides two blowers, each with a clutch of the mentioned type, which are adapted to be connected either parallel or in tandem.

An embodiment of the invention is illustrated diagrammatically by way of example in the accompanying drawings, in which, Fig. 1 is a side elevation, partly in section, of an apparatus embodying the invention in practical form and showing two blowers connected in parallel.

Figure 1:
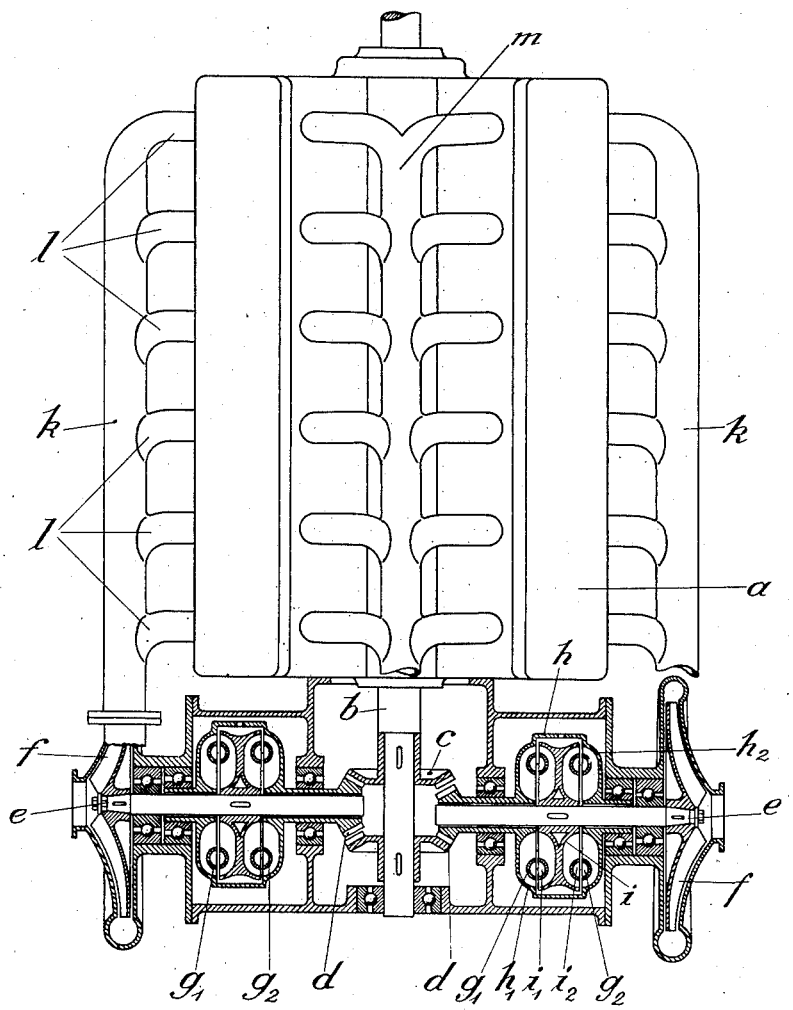

According to the invention as shown in Fig. 1, $a$ designates the engine, $b$ the crank shaft or a shaft driven at a high speed thereby, and which drives the axially displaced bevel wheels $d$ through the intermediary of bevel wheels $c$. The shafts $e$ for the blowers $f$ which feed the compressed air into the conduits $k$ rotate freely relatively to these parts. Two embodiments are shown for the construction of the compressed air conduits. According to the embodiment illustrated in Fig. 1 each blower is connected to a manifold supplying a row of engine cylinders. The air conduits $k$ are located on the outer sides of the rows of cylinders. The air is fed to the individual cylinders through the branch pipes $l$. A common exhaust pipe $m$ is arranged between the two rows of cylinders.

Figure 2:
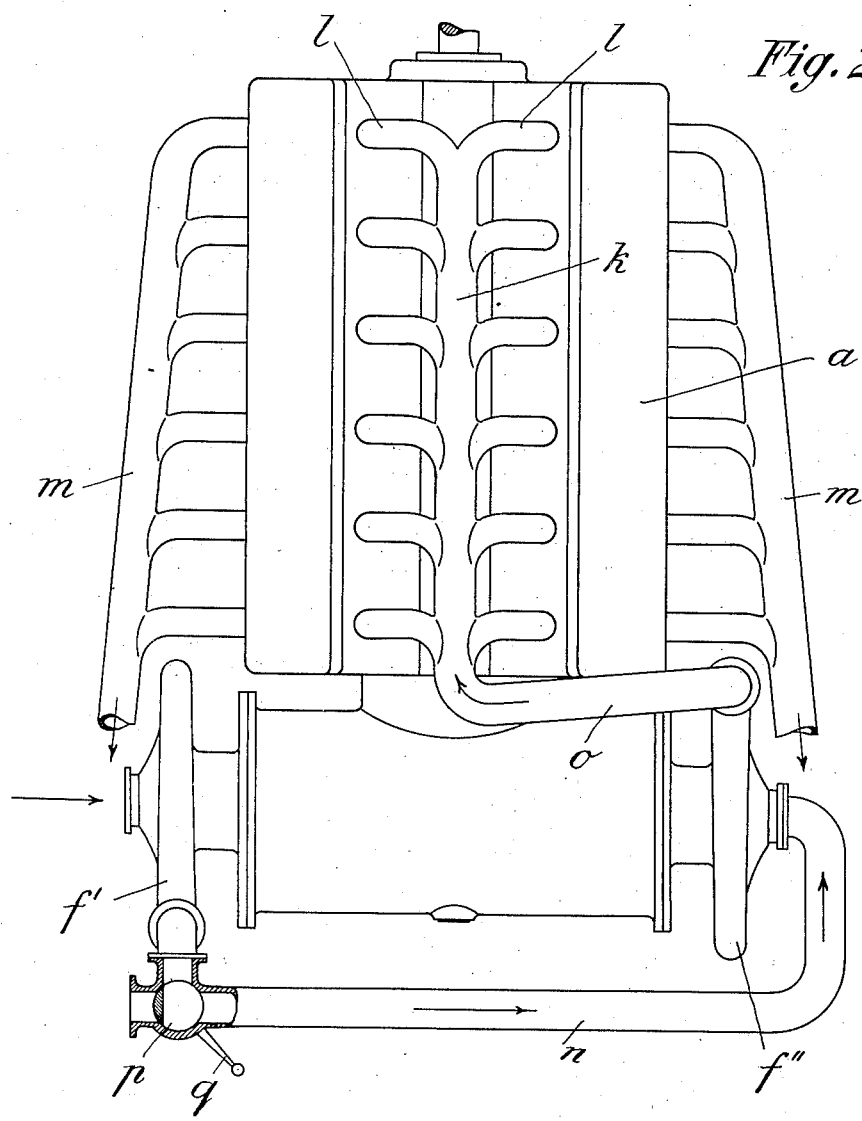
Fig. 2 is a side elevation of a modification in which two blowers are connected in series.
Figure 2A:
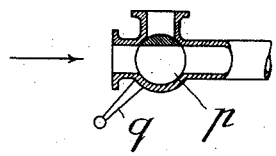
Fig. 2a is a fragmentary view of detail.

According to the form of construction illustrated in Fig. 2 the two blowers are connected in series. The blower $f'$ on the left side forms the first pressure stage and the blower $f''$ on the right side forms the second pressure stage. As can be seen from the drawing the air flows from the first stage blower $f'$ through the conduit $n$ to the second stage blower $f''$ and thence through the pipe $o$ to the common air conduit $k$ arranged between the rows of cylinders the air being fed to the individual cylinders through the branch pipes $l$. As the quantity of air required and the degree of compression changes according to the altitude, a cock $p$ in the conduit $n$ connecting the two blowers enables one of the blowers to be cut-out. When the cock $p$ is in the position illustrated in Fig. 2 both blowers are operative that is the left blower $f$ as first stage feeds the sucked-in air into the blower $f''$ which represents the second stage. By shifting the lever $q$ into the position shown in Fig. 2a the blower $f'$ is cut-out entirely and only the blower $f''$ delivers air to the engine. The blower $f'$ for example may be stopped by emptying the hydraulic clutch.

According to the invention a hydraulic clutch in interposed between the bevel wheels $d$ and the shafts $e$. This clutch is constructed as a double clutch and comprises the two separate clutches $g_1$ and $g_2$. Each bevel wheel $d$ is connected with the driving part, the pump wheel $h$, which surrounds the two outer wheel parts $h_1$ and $h_2$ (clutch cups) whereas the driven part, keyed on the shaft $e$, the turbine wheel $i$, surrounds the two middle wheel parts $i_1$ and $i_2$.

This construction of the hydraulic clutch as a double clutch presents the advantage that, owing to the countermovement of the liquid currents, the axial pressures are counterbalanced so that no or practically no axial pressures occur on the shafts, this being of advantage especially at the high speeds and when the blower is adapted to be shut off. The clutch may be a disengageable or non-disengageable clutch, the disengagement being effected for example by drawing off the liquid from the clutch (for example through throttle openings on the periphery of the pump wheels $h$).

The provision of two blowers $f$ also allows a multistage compression of the air in that one blower is used as low pressure and the other as high pressure blower. The blowers may, however, also work at the same pressure. In this or in that instance it is also possible, to temporarily engage or disengage the one or the other or simultaneously both the blowers, so that a considerable adaptation to the service conditions can be attained, especially to the actual height of flight of the airplane. By arranging the blowers at the two sides of the engine shaft transversely to the axial direction thereof a great saving in parts, space and weight is attainable.

Figure 3:
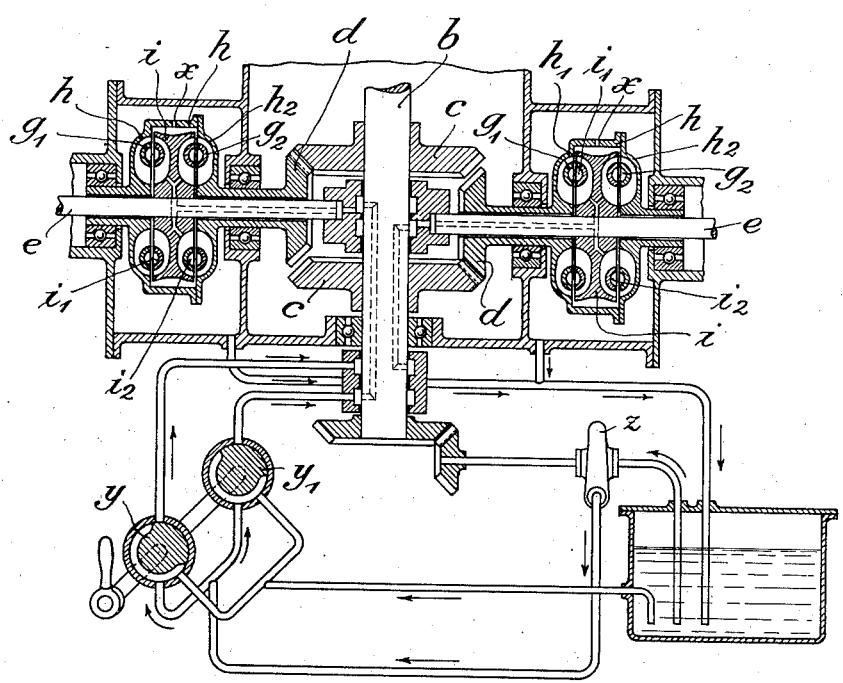
Fig. 3 is a sectional view of a modification including clutch regulating means.

In Fig. 3, the pump $z$ feeds fluid to the two regulating valves $y$ and $y'$ which are mounted on a common manually controlled shaft, and thus the fluid passing to the clutches from the shafts $e$ can be regulated simultaneously.

If desired, other clutches operating in the same or in a similar manner to the hydraulic clutches, for example electric couplings or the like operating on the eddy current system may be employed instead of the hydraulic clutches: kinetic or damping clutches. The regulation of the clutches is effected by the amount of liquid or amperage which is delivered to them.

Having now particularly described and ascertained the nature of my invention and in what manner the same is to be performed, I declare that what I claim is:

1. Arrangement for charging internal combustion engines comprising an internal combustion engine with two blowers for charging the cylinders and two non-mechanical kinetic clutches, said blowers being driven by the internal combustion engine through said regulable kinetic clutches, one clutch being provided for each blower and gearing means for driving said clutches, one clutch being provided for each revolutions than that of the internal combustion engine.

2. Arrangement for charging internal combustion engines according to the preceding claim, the blowers and the kinetic clutches being arranged on the two sides of the engine shaft substantially symmetrically on the blower shafts extending transversely of the engine shaft and driven thereby.

3. Arrangement for charging internal combustion engines, comprising an internal combustion engine with two blowers for charging the cylinders and two hydraulic clutches, said blowers being driven by the internal combustion engine through said regulable hydraulic clutches, one clutch being provided for each blower and gearing means for driving said clutches and blowers at a higher number of revolutions than that of the internal combustion engine.

4. Arrangement for charging internal combustion engines according to the preceding claim, the blowers and the hydraulic clutches being arranged on the two sides of the engine shaft substantially symmetrically on the blower shafts extending transversely to the engine shaft and driven thereby.

5. Arrangement for charging internal combustion engines, comprising an internal combustion engine with two blowers charging the cylinders and driven by the engine shaft, the blowers being arranged substantially symmetrically on opposite sides of the engine shaft, and transversely to the latter two bevel gears on the engine shaft, two further bevel gears arranged on opposite sides of the engine shaft, each meshing with one of the first said bevel gears and driving shafts connecting the first said bevel gears to the blowers, whereby the driving shafts being displaced one relatively to the other, and the bevel gears being arranged in such a manner that the blowers are driven in the same sense of rotation.

6. Arrangement for charging internal combustion engines, comprising an internal combustion engine, a drive shaft driven by the internal combustion engine and running in the longitudinal direction of the latter, a transverse shaft on each side of the drive shaft disposed transversely of the longitudinal direction of the drive shaft, toothed step-up gearing between the drive shaft and each of the transverse shafts causing the transverse shafts to revolve with a greater number of revolutions than does the drive shaft, an adjustable hydraulic coupling on each side of said drive shaft each driven by one of the transverse shafts, and a blower on each side driven by means of one of said adjustable hydraulic couplings.

7. Arrangement for charging internal combustion engines, comprising an internal combustion engine, a drive shaft driven by the internal combustion engine and running in the longitudinal direction of the latter, two adjustable hydraulic couplings arranged on opposite sides of the drive shaft and having their axes of rotation transversely disposed with respect to the longitudinal direction of the internal combustion engine, means for driving the hydraulic couplings from said drive shaft at a higher number of revolutions than that of the internal combustion engine, and two blowers, each of which is driven by means of one of said two liquid couplings.

8. Arrangement according to claim 6, wherein the toothed step-up gearing associated with each transverse shaft includes a pair of bevel gears which are so arranged that both transverse shafts revolve in the same direction of rotation and are substantially in the same plane as the drive shaft.

9. Arrangement according to claim 7, wherein the internal combustion engine comprises two rows of cylinders, and one of the hydraulic couplings with its associated blower is arranged substantially before the front of each of the rows of cylinders at the end of the engine, and each coupling has a connection with an inlet means arranged along each corresponding row of cylinders that is connected on the one hand to the blower on the side of the corresponding row of cylinders and on the other hand to the cylinders of said row of cylinders.

10. Arrangement according to claim 7, wherein a casing block includes the driving means, the hydraulic couplings and the blowers, and is secured to the casing of the internal combustion engine to form a common block.

11. Arrangement according to claim 1, in combination with piping means connecting one blower with only a certain number of the engine cylinders and further piping means connecting the other blowers with other engine cylinders.

12. Arrangement according to claim 3, in combination with piping means connecting one blower with only a certain number of the engine cylinders and further piping means connecting the other blowers with other engine cylinders.

13. Arrangement according to claim 1, in combination with piping means for connecting the two blowers in tandem with respect to the engine cylinders.

14. Arrangement according to claim 3, in combination with piping means for connecting the two blowers in tandem with respect to the engine cylinders.

15. Arrangement for charging internal combustion engines, comprising an internal combustion engine with two blowers adapted to charge the cylinders and two hydraulic clutches, said blowers being driven by the internal combustion engine through said hydraulic clutches, one clutch being provided for each blower and the blowers and hydraulic clutches being arranged on the two sides of the engine shaft substantially symmetrically on the blower shafts extending transversely to the engine shaft and driven thereby.

KARL KOLLMANN.